A. B. BOUGHAN.
AUTOMOBILE TIRE PROTECTOR.
APPLICATION FILED APR. 6, 1908.
923,322.
Patented June 1, 1909.
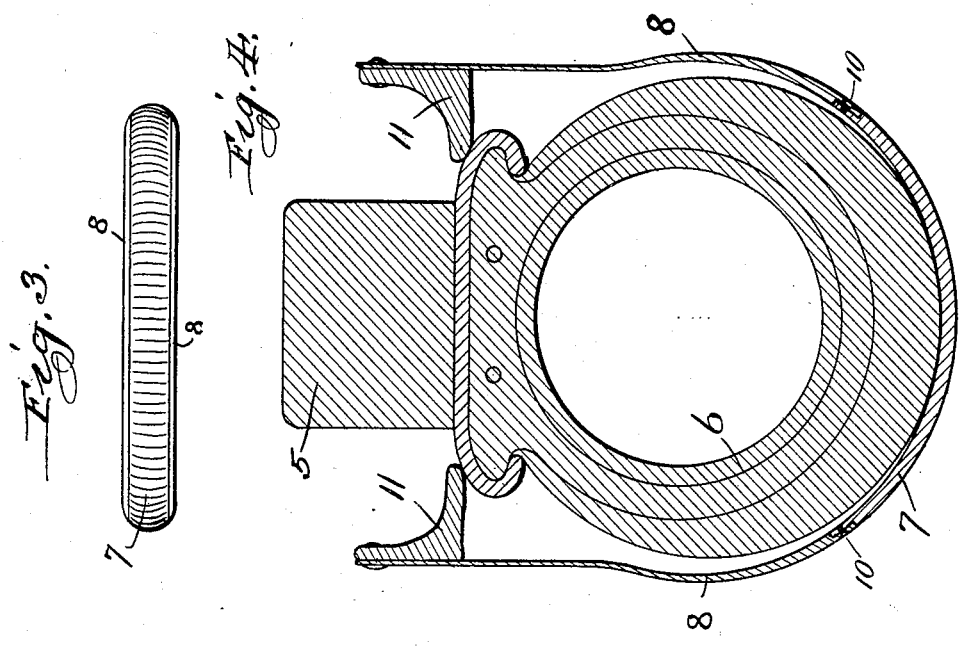
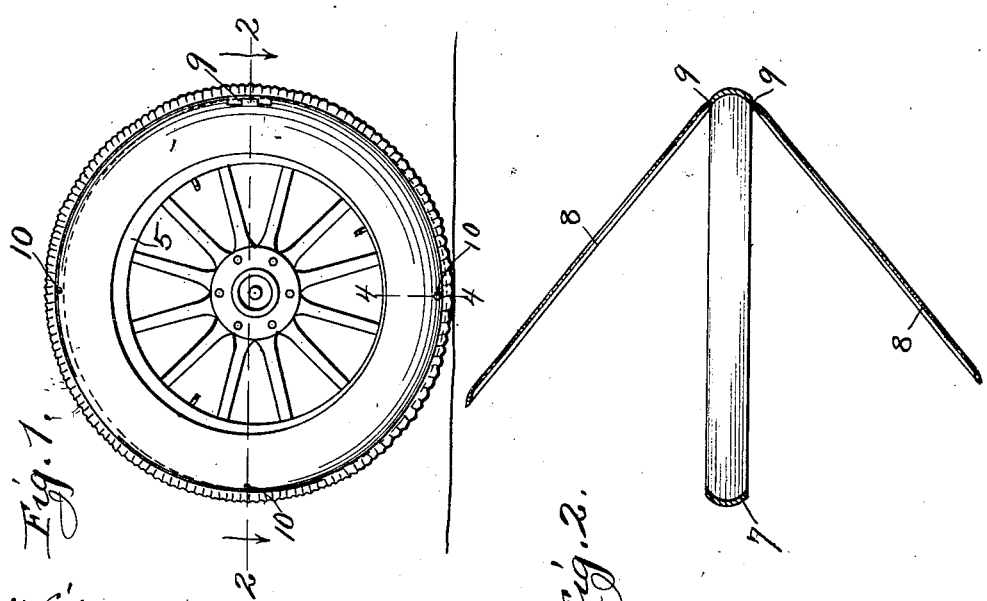
Witnesses:
Milton Lenoir
Lloyd S. Miller
Inventor:
Andrew B. Boughan
By R. J. Jacker
Atty.

UNITED STATES PATENT OFFICE.

ANDREW B. BOUGHAN, OF CHICAGO, ILLINOIS.

AUTOMOBILE-TIRE PROTECTOR.

No. 923,322.  Specification of Letters Patent.  Patented June 1, 1909.

Application filed April 6, 1908. Serial No. 425,552.

*To all whom it may concern:*

Be it known that I, ANDREW B. BOUGHAN, a citizen of the United States, residing at Chicago, in the county of Cook and State of Illinois, have invented a new and useful Automobile-Tire Protector, of which the following is a specification.

My invention relates to tire protectors which are adaptable to the ordinary pneumatic tire and practically inclose the whole tire and the objects of my improvements are, first, to prevent the tire from getting punctured; second, to provide a protector which can easily and quickly be applied; third, to make a light and durable device and other objects to become apparent from the description to follow.

This protector is made in three parts; a central or tread portion which may be knurled on the exterior if desired, and two side rims which are preferably hinged to the central portion.

To describe my invention so that others versed in the art to which it pertains may make and use the same I have illustrated it on the accompanying sheet of drawing forming a part of this specification in which:

Figure 1, is a side elevation of a tire protector embodying my invention applied to an automobile tire; Fig. 2 is a sectional view taken on line 2—2 of Fig. 1, showing the protector alone and the side rims swung outward on their hinges; Fig. 3, is a top plan view of the protector closed, and Fig. 4, is an enlarged sectional view taken on line 4—4 of Fig. 1.

Similar reference characters refer to similar parts throughout the several views.

The wheel 5 is provided with any ordinary pneumatic tire 6, and the central tread portion 7 of the protector is slightly larger in diameter than the tire 6 as seen in Fig. 1. The tread portion 7 in cross section is of a slightly larger curve than the curve of the tire 6 as seen in Fig. 4. A rim 8 is fitted to each side of the tread portion 7 and these are preferably hinged to the same at 9, and secured in a closed position close to the tread portion 7 by any means of fastening as screws 10. To prevent dirt and dust or gravel from lodging between the tire 6 and the protector, I place on the free edge of each rim 8 a circular piece of felt or other suitable material 11 to be in constant contact with the rim of the wheel.

To place the protector on the wheel one or both of the rims 8 are swung out on their hinges and the wheel with the tire is placed into position and then the said rims 8 are again secured in place. To remove the protector the operations are reversed.

Having thus fully described my invention what I claim as new and desire to secure by Letters Patent of the United States is:

In a tire protector, a central annular tread portion, a side rim hinged to and fitted to said central tread portion to inclose the side of the tire and a dust guard provided to prevent dust from lodging between the tire and the protector.

In testimony whereof I have signed my name to this specification in presence of two subscribing witnesses this 31st day of March, 1908, at Chicago, Illinois.

ANDREW B. BOUGHAN.

Witnesses:
 MILTON C. LENOIR,
 J. E. BAILEY.